United States Patent [19]

Hyoi

[11] Patent Number: 5,114,219
[45] Date of Patent: May 19, 1992

[54] EYEGLASS FRAME HAVING TUBULAR CONNECTORS

[75] Inventor: Isao Hyoi, Fukui, Japan

[73] Assignee: Murai Co., Ltd., Fukui, Japan

[21] Appl. No.: 543,842

[22] PCT Filed: Nov. 18, 1988

[86] PCT No.: PCT/JP88/01166
§ 371 Date: Jul. 17, 1989
§ 102(e) Date: Jul. 17, 1989

[87] PCT Pub. No.: WO90/05935
PCT Pub. Date: May 31, 1990

[51] Int. Cl.$^5$ .......................... G02C 5/14; G02C 5/02
[52] U.S. Cl. ...................... 351/121; 351/153; 351/124
[58] Field of Search ............ 351/51, 52, 121, 140, 351/153, 124, 129, 133; 16/228

[56] References Cited

U.S. PATENT DOCUMENTS 4,950,066 8/1990 Hartman ..................... 351/52

FOREIGN PATENT DOCUMENTS 3503644 10/1984 Fed. Rep. of Germany ...... 351/140

Primary Examiner—Rodney B. Bovernick
Attorney, Agent, or Firm—Armstrong, Nikaido, Marmelstein, Kubovcik & Murray

[57] ABSTRACT

An eyeglass frame comprises rims (3), a bar (4) and temples (6). The first engagement tubes (5) are secured to the opposite ends of the bar (4), and a second engagement tube (7) is secured to the securing end of each of the temples (6). These assemblies are secured to each other and the first engagement tubes (5) are secured to the respective rims (3). With such an eyeglass frame, it is possible to reduce the number of steps in a manufacturing process and the number of parts.

3 Claims, 2 Drawing Sheets

FIG. 4
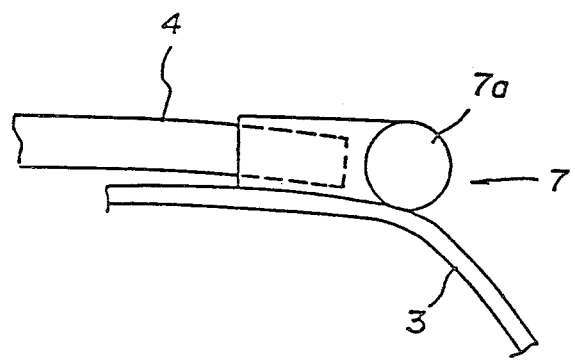
FIG. 5(A)
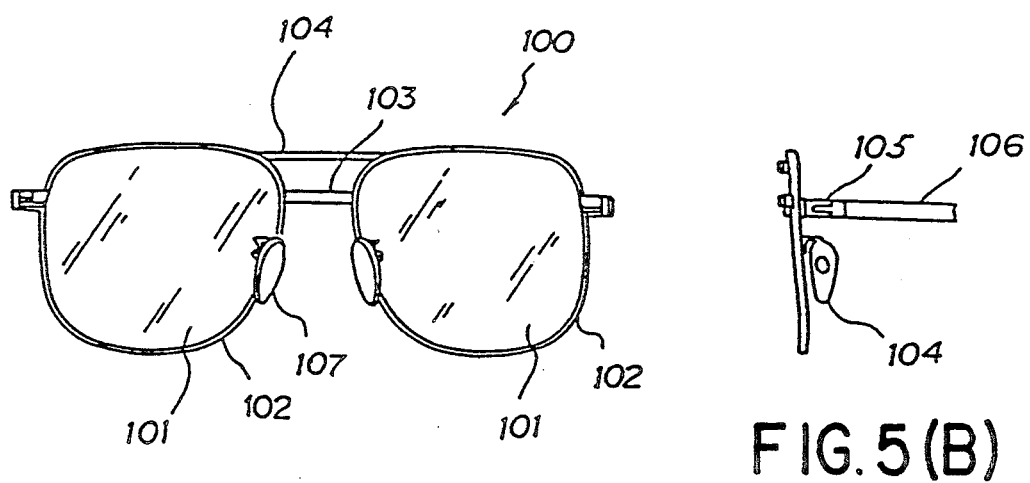
FIG. 5(B)

EYEGLASS FRAME HAVING TUBULAR CONNECTORS

DESCRIPTION

1. Technical Field

The present invention relates to an eyeglass frame made of a material which is extremely difficult to work, for example, an NT alloy (shape memory alloy).

2. Background Art

A conventional eyeglass frame of this type is shown as an eyeglass frame 100 in FIG. 5 (Japanese Standards Association, *Terminology of Eyeglasses*, page 8, issued on Apr. 1, 1987). The eyeglass frame 100 comprises a pair of right and left rims 102 which support right and left eyeglass lenses 101, respectively. The pair of right and left rims 102 is connected by a bridge 103. To reinforce the connection between the rims 102 provided by the bridge 103, a brace bar 104 is disposed above the bridge 103 to connect the top portions of the pair of right and left rims 102.

A pair of pads 107 which is supported by the nose of a user is mounted on the inner sides of the respective left and right rims 103. Reference numeral 105 denotes a side joint which serves as a hinge, and a temple 106 is pivotally secured to the side joint 105.

The eyeglass frame 100 having the above-described arrangement needs a considerable number of parts since the side joints 105 are formed on the outer portions of the respective rims 2 and the temples 106 are secured to the respective side joints 105. In particular, in the case of eyeglass frames employing an NT alloy material, since NT alloy materials are difficult to solder, conventional connecting tools and special connecting tools are needed to bond the NT alloy members to the outer peripheries of the respective rims.

In addition, the manufacturing process needs the step of connecting the rims 102 by means of the bridge 103 and securing the temples 106 to the respective side joints 105.

DISCLOSURE OF THE INVENTION

The object of the present invention is to solve the above-described problems experienced with the prior art. In an eyeglass frame comprising rims for supporting a pair of right and left eyeglass lenses, a bar disposed between the upper portions of the respective rims so as to connect the rims, and temples secured to the bar of eyeglasses, first engagement tubes are secured to opposite ends of the bar, and second tubes are secured to the securing ends of the respective temples. The first engagement tubes secured to the opposite ends of the bar are fixedly connected to the corresponding second engagement tubes secured to the mounting ends of the respective temples, and the first engagement tubes are secured to the respective rims. With the above-described arrangement, the number of parts required to secure the temples to the rims can be reduced. In addition, since the temples are connected to the opposite ends of the bar and the bar is then secured to the upper portions of the respective rims, it is possible to reduce the number of steps in a manufacturing process.

BRIEF DESCRIPTION OF THE DRAWINGS

FIG. 4 is a front view of the connection between the bar and the temple; and

FIG. 5 shows an eyeglass frame according to a prior art, and Part 5 (A) is a front view of the eyeglass frame, while Part 5 (B) is a side view of the same.

BEST MODE FOR CARRYING OUT THE INVENTION

Figure 1:
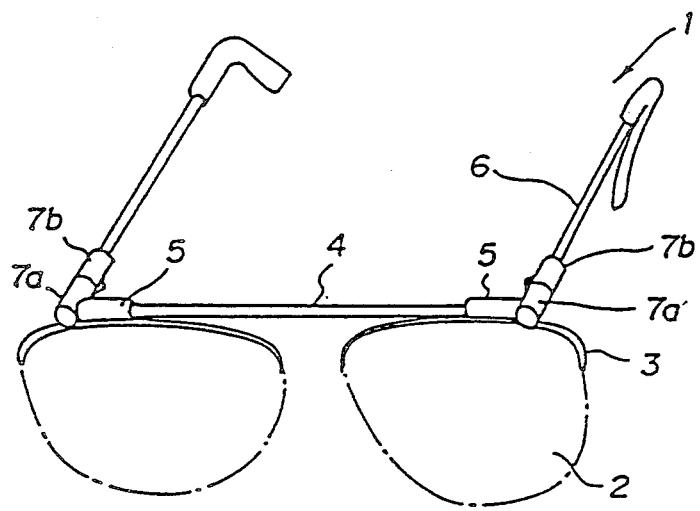
FIG. 1 is a perspective view of an eyeglass frame according to the present invention.
Figure 2:
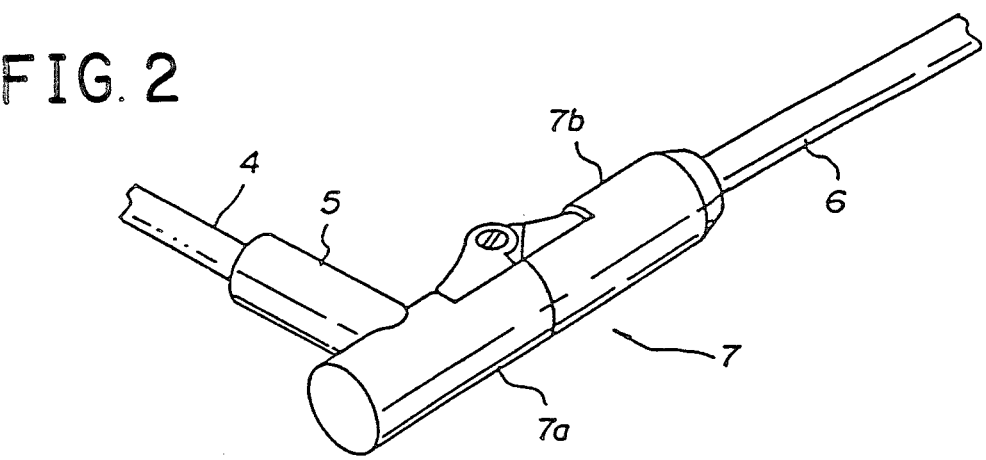
FIG. 2 is a perspective view of the connection between a bard and a temple in the eyeglass frame according to the present invention.
Figure 3:
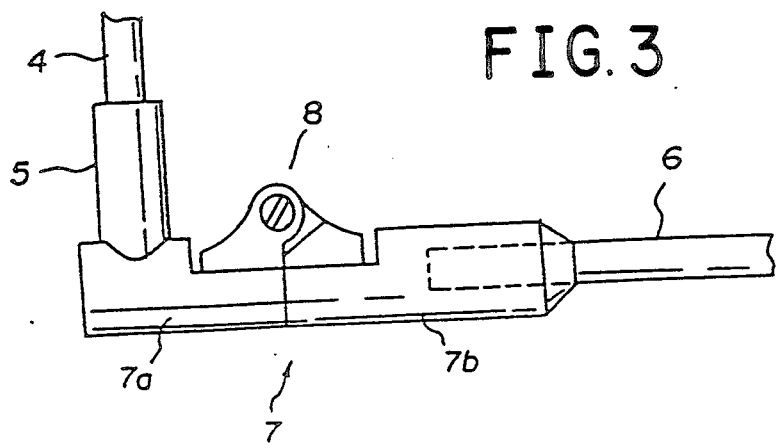
FIG. 3 is a plan view of the connection between the bar and the temple.

An embodiment of the present invention will be described below with reference to the accompanying drawings. FIG. 1 is a perspective view of an eyeglass frame, and the eyeglass frame according to the present invention is indicated generally at 1. The eyeglass frame 1 comprises rims 3 for supporting right and left eyeglass lenses 2, respectively.

A bar 4 is disposed above the rims 3 and the bar 4 and the rims 3 are connected to each other. The connection between the bar 4 and the rims 3 is accomplished by securing engagement tubes 5 made of nickel silver or the like to the opposite ends of the bar 4 and pinching the first engagement tubes 5.

Second engagement tubes 7 are secured to the mounting ends of the respective temples 6, and each of the second tubes 7 is divided into halves 7a and 7b. A hinge 8 is connected between the halves 7a and 7b, and each of the temples 6 can be rotated inwardly by means of the hinge 8.

The end face of each of the first engagement tubes 5 is secured to a side face of each of the second engagement tubes 7 by soldering. In this arrangement, the connection between the temple 6 and the half 7b of the corresponding second engagement tube 7 is accomplished by inserting the end of the temple 6 into the second engagement tube 7b and securing the second engagement tube 7b by pinching, as in the case of the connection between the bar 4 and the first engagement tubes 7a.

The eyeglass frame 1 is secured in the following manner. First of all, the first engagement tubes 5 are secured to the opposite ends of the bar 4. Then, the end of each of the temples 6 is inserted to the second engagement tube 7b connected by the hinge 8 and secured by external pinching.

Thereafter, the end faces of the respective first engagement tubes 5 are secured to the side faces of the corresponding second engagement tubes 7 by soldering, thereby connecting the bar 4 to the temples 6. Then, the first engagement tubes 5 are secured to the upper portions of the respective rims 3 by soldering, whereby the eyeglass frame 1 is finished.

In accordance with the eyeglass frame 1 having the above-described arrangement, as described above, the bar 4 is connected to the first engagement tubes 7a in advance and each of the first engagement tubes 7 is then secured to the second engagement tube 7a mounted on the end of each of the temples 6 by soldering, and the assembly thus obtained is secured to the rims 3. Accordingly, the number of steps in a manufacturing process can be greatly reduced.

In addition, since the temples 6 are directly connected to the bar 4 as described above, the parts required for conventional side joints can be omitted and the number of parts can be reduced.

The above explanation states that, after the bar 4 has been connected to the temples 6, the assembly is connected to the rims 3. However, as a matter of course, after the bar 4 is connected to the rims 3, the temples 6 may be connected to the assembly. In addition, not only the first engagement tubes 5 of the opposite ends of the bar 4 but also the halves 7a of the second engagement tubes 7 of the respective temples 6 may be secured to the rims 3.

INDUSTRIAL APPLICABILITY

Although the eyeglass frame according to the present invention can be applied to general eyeglasses, it can find particularly suitable use in the field of eyeglass frames made of a material which is extremely difficult to work, for example, an NT alloy (shape memory alloy).

I claim:

1. An eyeglass frame for a pair of right and left eyeglass lenses, comprising:
   rims for supporting the right and left eyeglass lenses;
   a bar member disposed between upper portions of said rims, said bar member having opposite ends;
   first engagement tubes secured to the opposite ends of said bar member;
   second engagement tubes fixedly secured to said first engagement tubes, respectively; and
   temple members secured to said second engagement tubes,
   said first engagement tubes being secured to the upper portions of said rims so that a gap is maintained between said bar member and said upper portions of said rims.

2. An eyeglass frame as recited in claim 1, wherein said engagement tubes are secured to said bar member and said temple members, respectively, by pinching.

3. An eyeglass frame according to claim 1, with each of said second engagement tubes comprising:
   a first half fixedly secured to said first engagement tubes, and
   a second half fixedly secured to said temple members, wherein said first half is pivotally mounted to said second half, and said temple members can pivot relative to said bar member.

* * * * *

UNITED STATES PATENT AND TRADEMARK OFFICE
CERTIFICATE OF CORRECTION

PATENT NO. : 5,114,219
DATED : May 19, 1992
INVENTOR(S) : Isac Hyoi

It is certified that error appears in the above-indentified patent and that said Letters Patent is hereby corrected as shown below:

On title page, Item [86], lines 1 and 2, change "July 17, 1989" to --July 17, 1990--.

Signed and Sealed this

Twenty-sixth Day of October, 1993

Attest:

BRUCE LEHMAN

Attesting Officer    Commissioner of Patents and Trademarks